UNITED STATES PATENT OFFICE.

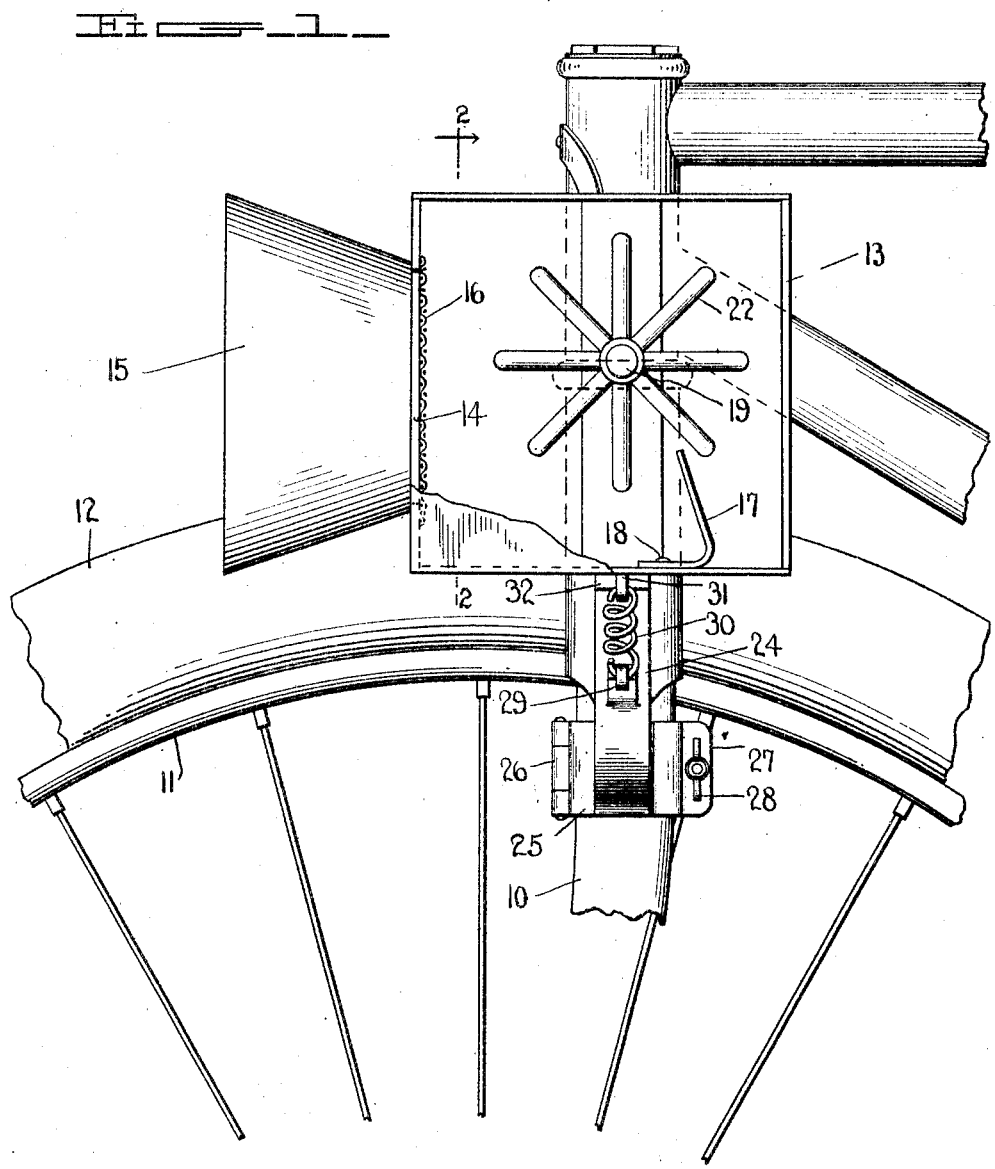

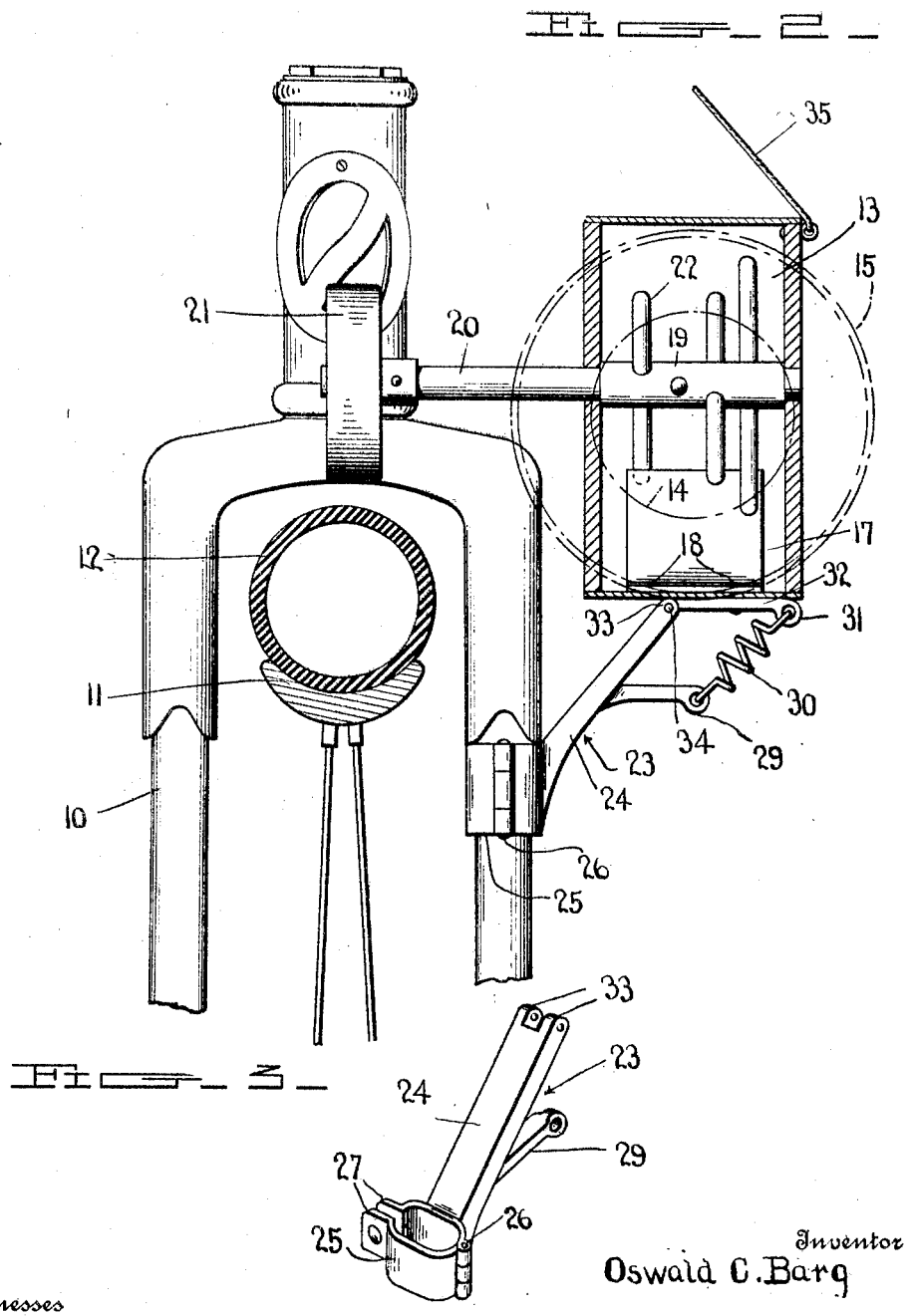

OSWALD C. BARG, OF SALT LAKE CITY, UTAH.

BICYCLE-HORN.

1,009,885.

Specification of Letters Patent.

Patented Nov. 28, 1911.

Application filed November 29, 1910. Serial No. 594,732.

*To all whom it may concern:*

Be it known that I, OSWALD C. BARG, a citizen of the United States, residing at Salt Lake City, in the county of Salt Lake, State of Utah, have invented certain new and useful Improvements in Bicycle-Horns; and I do hereby declare the following to be a full, clear, and exact description of the invention, such as will enable others skilled in the art to which it appertains to make and use the same.

This invention relates to alarm devices for bicycles and has for an object to provide a novel form of horn that may be attached to the front fork of a bicycle and will be operated from the front tire of the bicycle.

A further object of the invention is to provide a novel form of attaching clamp for the horn.

With the above objects in view the invention consists of the novel details of construction and combination of parts hereinafter fully described and claimed, it being understood that various modifications may be made in the minor details of construction within the scope of the appended claim.

In the accompanying drawing forming part of this specification, Figure 1 is a fragmentary side elevation of a bicycle with my improved horn attached thereto, portions of the latter being broken away to expose the interior of the horn. Fig. 2 is a fragmentary front elevation of the bicycle with my improved horn applied thereto, and shown in section, the section being taken on the line 2—2 Fig. 1. Fig. 3 is a detail perspective view of the clamp.

Referring now to the drawing 10 designates a bicycle front fork, 11 the front wheel, and 12 the front tire, these parts being of the ordinary construction.

The horn comprising the subject matter of this invention consists of a casing 13 which is preferably rectangular in contour and cross section and is provided in its front wall with an opening 14. A frusto-conical shell 15 has its smaller base edges fixed to the marginal portions of the opening 14 and forms an outlet for the noise generated within the casing by a hereinafter described vibrator. A reticulate element closes the opening 14 and prevents foreign matter from gaining access to the casing 13.

Arranged upon the bottom wall of the casing is an angular leaf or vibrator 17, one leg of this vibrator being riveted or otherwise secured to the bottom of the casing as shown at 18, and the mating leg extending upwardly toward the center of the casing. The vibrator is formed of spring material and is designed when struck forcibly to spring back to its initial position and emit a discordant note, these notes during the play of a hereinafter described agitator on the vibrator, blending into a discordant squawk.

The agitator consists of a shaft 19 which is journaled transversely in the casing, and one end 20 of this shaft projects considerably beyond the outer wall of the casing and is equipped with a friction disk 21 which when the casing is rocked bodily toward the bicycle tire will engage the top of the tire 12 and rotate the shaft. A plurality of pins 22 are engaged in staggered relation through the shaft 19, the opposite ends of these pins projecting from opposite sides of the shaft and being of such length as to impinge against the vibrator during the rotation of the shaft and cause the vibrator to be displaced, and as above stated during such displacement and the return of the vibrator to its initial position, the harsh note is emitted.

For securing the casing to the front fork, a clamp 23 is provided, the same comprising a straight shank 24 one end of which is formed with an integral split ring 25 the halves of this ring being hingedly connected together as shown at 26 and terminating at their free ends in parallel lips 27 through which a thumb screw 28 is passed, after the ring has been engaged upon the front fork, this thumb screw clamping the halves to the fork. The shank of the clamp is provided with a laterally projecting arm 29 and to this arm is secured at its free end a terminal convolution of a helical spring 30, the opposite terminal convolution of this spring being secured to an eye 31, carried by a strap 32 which at the end remote from the eye is passed in between the bifurcated free end 33 of the clamp shank, a pivot pin 34 being then passed through the shank and strap to pivotally mount the casing on the shank.

A draw cord 35 is fixed to the upper outer corner of the case and it will be observed that when this draw cord is pulled obliquely upwardly that the casing will be rocked toward the fork and the friction disk engaged with the tire. Upon the cord being released the helical spring will return the casing to its initial position.

What is claimed is:—

An alarm device comprising a securing bracket, a casing pivoted on said securing bracket and having a flared extension forming a horn, an angular resilient vibrator fixed to the bottom of said casing and having a free leg extending upwardly therein, a rotary agitator having a plurality of spaced staggered vibrator engaging fingers and having a shaft projecting through said casing, a friction disk on said shaft for actuating said vibrator, a draw cord for rocking said casing whereby to move said friction disk to operative position, and a spring carried by said bracket and engaging said casing for returning the casing to its initial position.

In testimony whereof, I affix my signature, in presence of two witnesses.

OSWALD C. BARG.

Witnesses:
L. DEVENPORT,
L. G. BARG.